United States Patent
Zusman (10) Patent No.: US 8,250,566 B2
(45) Date of Patent: Aug. 21, 2012

(54) AUTOMATED SOFTWARE UPGRADE AND DISTRIBUTION

(76) Inventor: Mark Zusman, Boyds, MD (US)

(*) Notice: Subject to any disclaimer, the term of this patent is extended or adjusted under 35 U.S.C. 154(b) by 1023 days.

(21) Appl. No.: 12/202,518

(22) Filed: Sep. 2, 2008

(65) Prior Publication Data

US 2009/0089775 A1  Apr. 2, 2009

Related U.S. Application Data

(60) Provisional application No. 60/975,623, filed on Sep. 27, 2007.

(51) Int. Cl.
G06F 9/44 (2006.01)
(52) U.S. Cl. .................. 717/173; 717/171; 717/176
(58) Field of Classification Search .............. 717/171, 717/176
See application file for complete search history.

(56) References Cited

U.S. PATENT DOCUMENTS

| | | | |
|---|---|---|---|
| 5,940,074 A | 8/1999 | Britt, Jr. et al. | 715/749 |
| 5,960,204 A * | 9/1999 | Yinger et al. | 717/176 |
| 6,687,901 B1 * | 2/2004 | Imamatsu | 717/173 |
| 7,266,819 B2 | 9/2007 | Helgesen et al. | 717/176 |
| 7,366,460 B2 * | 4/2008 | O'Farrell et al. | 455/3.06 |
| 8,060,874 B2 * | 11/2011 | Rengarajan et al. | 717/177 |
| 2004/0031029 A1 * | 2/2004 | Lee et al. | 717/171 |
| 2004/0133887 A1 | 7/2004 | Herle et al. | 717/171 |
| 2004/0224674 A1 * | 11/2004 | O'Farrell et al. | 455/418 |
| 2004/0237079 A1 * | 11/2004 | Cox et al. | 717/168 |
| 2004/0255288 A1 * | 12/2004 | Hashimoto et al. | 717/171 |
| 2005/0044165 A1 * | 2/2005 | O'Farrell et al. | 709/213 |
| 2006/0195835 A1 | 8/2006 | Olrik et al. | 717/168 |
| 2008/0184221 A1 * | 7/2008 | Rengarajan et al. | 717/173 |

OTHER PUBLICATIONS

S. Brown, "Updating Software in Wireless Sensor Network: A Survey", Jul. 13, 2006.*
Han et al., "Sensor Network Software Update Management: A Survey", 2005.*

* cited by examiner

*Primary Examiner* — Phillip H Nguyen
(74) *Attorney, Agent, or Firm* — Matthew A. Pequignot; Pequignot + Myers LLP (57) ABSTRACT

A method for an automated upgrade of hardware devices of a specialized network, such as wireless communication devices or automated teller machines, with new software programs is described. The upgrade is performed over the network and is controlled by a control center of the network. The control center has an access to a software program repository for storing new programs. The automated upgrade is performed by selecting suitable new software programs from the repository, each of the programs being associated with a validity time window and a threshold hardware profile, performing corresponding checks of upgrade time windows and hardware profiles of the hardware devices being upgraded, and downloading the new software programs to the memory medium of the hardware devices being upgraded.

20 Claims, 5 Drawing Sheets

AUTOMATED SOFTWARE UPGRADE AND DISTRIBUTION

CROSS-REFERENCE TO RELATED APPLICATIONS

The present invention claims priority from U.S. Provisional Application No. 60/975,623 filed Sep. 27, 2007, entitled "Software Update And Distribution Method" which is incorporated herein by reference for all purposes.

TECHNICAL FIELD

The present invention is related to software and firmware upgrades of remotely located equipment over a network, and in particular to upgrades of specialized equipment having a limited data processing capability.

BACKGROUND OF THE INVENTION

Many modern electronic hardware devices are controlled by a central processing unit (CPU) executing a program stored on a storage medium. Due to their manufacturability and versatility, CPUs nowadays are used in pagers, cell phones, digital subscriber link (DSL) modems, automated teller machines, and other devices. The specific functionality of the CPU-controlled devices is achieved by a suitable programming of the CPU. This approach is very flexible in that it allows the devices to be upgraded by upgrading the software program stored on the storage medium. Furthermore, if the storage medium is rewritable, an upgrade is possible without replacing any hardware, by simply recording a new version of a software program on the rewritable storage medium of the hardware device.

While upgrading a single CPU-controlled hardware device is a relatively simple task, it becomes considerably more difficult when the devices are a part of a specialized network, for example a network of automated teller machines, or a wireless communications network, or a DSL data network having many DSL modems. In addition, the hardware modules servicing a data network, such as network routers, need to be upgraded from time to time as well. For convenience, a specialized CPU-controlled networked device such as an automated teller machine, a wireless communication device, a DSL modem, a cable television set box, or a network router, upgradeable with an updated version of a software program (SP), is termed hereinafter a hardware device (HD).

Not only are the HDs generally expected to have short down times, but all the devices belonging to a particular network, the upgraded ones and the ones yet to be upgraded, are expected to behave in a certain pre-defined way in response to a certain standard command received from a control center of the network. Furthermore, an unsuccessful upgrade attempt can lead to a remote HD lockdown which would require the presence and intervention of a field technician. Since the amount of remote HDs in a network can reach hundreds and thousands, the network upgrade task can be daunting unless the upgrade procedure is automated.

An automated update procedure has been implemented for personal computers (PCs) on a network such as a local area network or the Internet. It is well known, for example, that a Microsoft™ Windows™ operating system software update can be performed over the Internet, by downloading a setup software package, which contains a full set of software modules and a setup program, to a hard disk of a Windows-running PC, and running the setup program on that PC. Among other steps, the setup program typically instructs the PC to do the following: determine its present software and hardware configuration; select, out of a standard set of modules downloaded, the software modules that match the current PC configuration; install the matching modules; and delete unnecessary components and temporary files. Most of the steps can be performed in an automatic mode, that is, in a mode not requiring the end user intervention, and can be run as a background task. Still, it is common to implement a warning to the end user, if a restart of the PC is required to complete the operating system software update.

Even though such an automated PC software update procedure is related to an upgrade of a microprocessor-equipped device over a network, it is unsuitable for upgrading an HD having far less processing power than a PC. In order to be able to download the entire setup software package, high connection speeds and large amounts of available memory of the local device are required which the HDs considered in the present invention do not usually have. Moreover, the CPUs of such HDs are simply not capable of handling complicated multi-tasking operations required to perform a software update in a way it is done for PCs. Not only that, but the requirements of continuous operation with limited down times, as well as the requirements of overall network robustness and reliability, are generally more stringent for a network of HDs then they are for a network of individual PCs. All these limitations preclude the PC software update method outlined above from being used for an upgrade of HDs over the network.

One method of solving the problem of updating software of cellular phones is described in US Patent Application Publication No. 2006/0195835 by Olrick et al., which is incorporated herein by reference. Olrick et al. suggest to solve the abovementioned problem of lack of CPU processing power and CPU memory required for performing the upgrade of cellular phones, by installing specialized computer based stations dedicated to the phone upgrades, in which the cellular phones to be upgraded would be loaded similarly to a way a compact disk loaded into a PC, that is, by using a specialized retractable tray the cellular phones would fit into. These upgrade stations are connected, through a general-purpose data network, to a central computer having a database of new cellular phone programs. The stations could be installed, for example, in cellular phone retail shops.

Undesirably, the method of Olrick et al. entails considerable expenses related to building a network of the upgrade stations and training retail shop representatives to use these stations to upgrade the phones. Furthermore, it requires the end users of cellular phones to physically deliver the phones to the retail shops, which is of course inconvenient for the end users.

Figure 1:
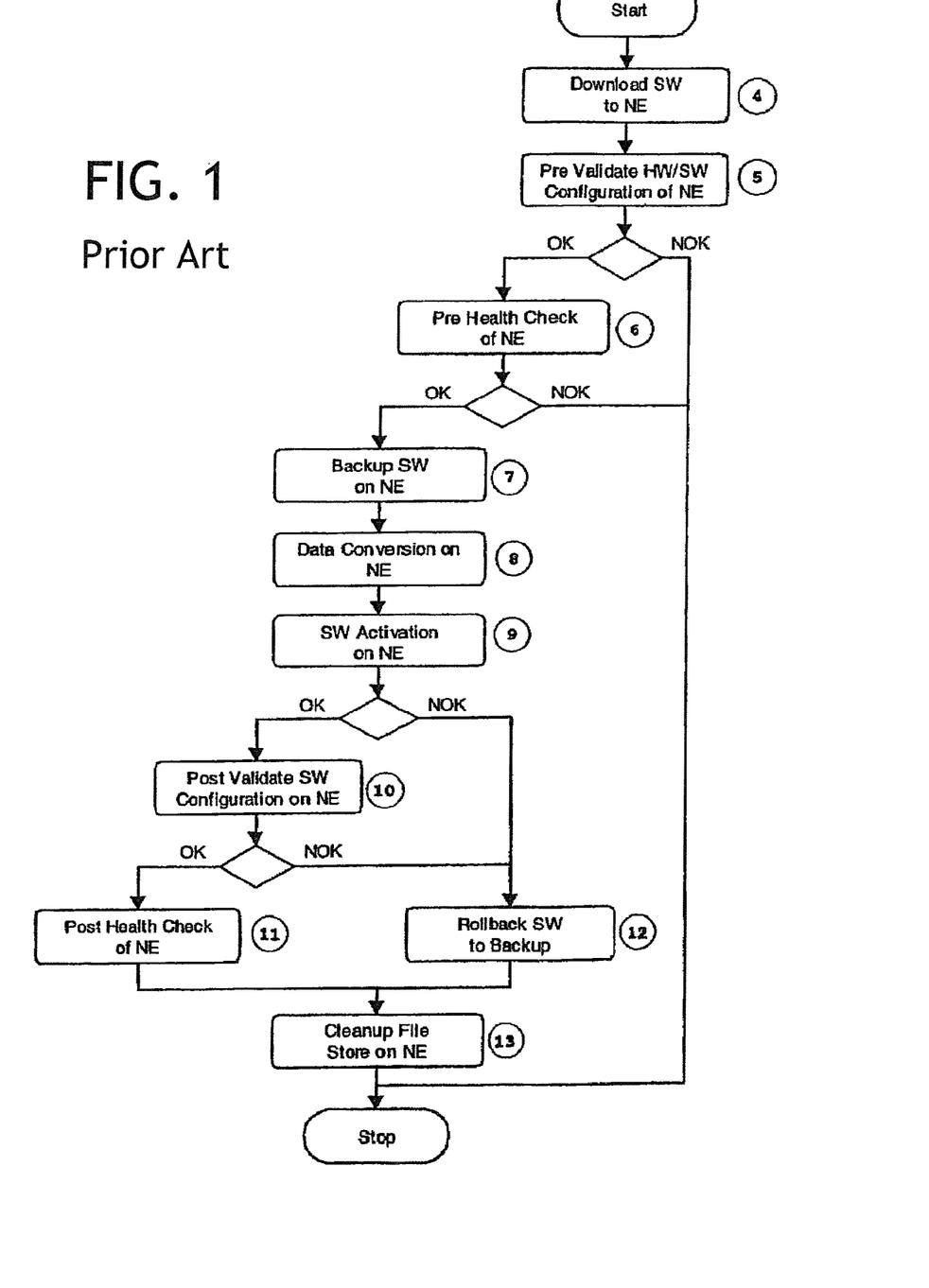
FIG. 1 is a block diagram of a prior-art method of a remote network element (NE) upgrade with a new software.

A method of upgrading software of network elements in data and communication networks is taught in U.S. Pat. No. 7,266,819 by Helgesen et al., which is incorporated herein by reference. In a preferred embodiment of U.S. Pat. No. 7,266,819, the upgrade process of network elements in a communication system is controlled from a certain workstation, herein termed an installation workstation, which runs a script controlling a network element (NE) to be upgraded. Turning now to FIG. 1, a block diagram of such a script is presented. At a step 4, the software package containing required software elements is downloaded from the installation workstation to the NE. At a step 5, a check of compatibility of the downloaded software package with hardware and software of the NE is performed to ensure that the new software is loadable into the hardware, and that the new software is compatible with the one presently installed. If the downloaded software is found to be compatible with both the software and the hardware of the NE, then, at a step 6, a check of operability of the NE is performed; if the NE is found to be operable, then, at a step 7, the present software is backed up in a memory medium of the NE and, at a step 8, the set-up constants and other data stored in the memory medium of the NE are converted for use with the new software. Then, the installation workstation of the NE assumes an exclusive control over the NE, and the activation of the new software is executed at a step 9. If the activation is successful, the exclusive control over the NE is released and, at steps 10 and 11, post validation checks are performed in order to test if the new software is working properly. If the installation was unsuccessful, or if the post validation checks find the NE non-operational, a rollback procedure 12 is performed. Then, before finishing the procedure, a cleanup 13 is performed. The full control over the NE during activation of new software is necessary to avoid conflicts and interferences with other network elements.

To understand the limitations and disadvantages of the method of Helgesen et al., the following example may be considered. A wireless carrier (WC) plans to roll out a new service, for example video clips, on their existing infrastructure. The WC already has remote probes deployed, and the supplier developed a version of a software (Version A) that can test the new service. The deployment has the following constraints: (1) the WC starts the roll-out in a manual fashion, upgrading one or two probes and verifying their real-life performance, and then upgrades all the remaining probes automatically, upon the successful verification; (2) the WC expects the delivery of a next version (Version B) of software in about six months, and it is very important to prevent an upgrade to Version A of the software after six months have passed; (3) the WC requires the upgrade to be performed only during maintenance hours, e.g. between 12 am and 6 am at night, to ensure that the upgraded remote probes can be tested at more challenging conditions, that is, during the peak hours of the wireless network.

Within the framework of the method of Helgesen et al., the constraints (1) to (3) above cannot be fulfilled. Indeed, the method of Helgesen et al. is not flexible enough to provide an option of upgrading individually selected phones on a trial basis. Further, disadvantageously, the method of Helgesen et al. does not provide for a possibility to upgrade to a specific version of a software which will expire after a certain time, e.g. in six months in the example above, neither does it provide a possibility to limit the automated upgrade to a pre-defined time window. Yet further, disadvantageously, the method of the prior art includes the step 4 of downloading the software to the NE, which is undertaken before determining compatibility of the software with the existing software and hardware of the NE being upgraded, at steps 5 and 6. If the software is found to be incompatible, the extensive and resource-consuming rollback procedure 12 has to be executed. Furthermore, the method of Helgesen et al. does not provide a means for taking into account an unsuccessful past upgrade of a particular device, when rolling out a new software upgrade across the entire network, which includes many devices.

Accordingly, it is an object of the present invention to provide a method allowing one to systematically roll out new software, revision by revision, over a network of HDs differing by hardware capabilities and by a length of field service. Advantageously, the method of the present invention performs all the necessary checks, including the past upgrade failures, before downloading a newer version of a SP to an HD thus saving valuable network resources. Further, advantageously, the method of the present invention is applicable to a wide variety of HDs which do not necessarily have computing resources sufficient to perform local software backup or de-installation.

SUMMARY OF THE INVENTION

In accordance with the invention there is provided a method for upgrading a hardware device (HD) with a software program (SP), wherein the HD has a storage medium for storing the SP, and wherein the HD is a part of an HD network that includes a plurality of HDs and a control center having:

an HD information database including a plurality of HD records corresponding to the HDs of the network, wherein each HD record contains a hardware profile, a revision of a presently stored SP, an "upgrade-mode" flag, and a "software out-of-date" indicator, wherein said hardware profile contains a model, a vendor, and a hardware revision; and an SP repository for storing SPs, wherein the SP repository includes a plurality of SP records, wherein each SP record contains an SP, a revision of said SP, a validity time window of said SP, and a threshold hardware profile of an HD compatible with said SP, wherein said threshold hardware profile contains a model, a vendor, and a hardware revision;

wherein the method comprises the steps of:
(a) determining that the HD is eligible for an automatic upgrade, in dependence upon a state of the "upgrade-mode" flag stored in a corresponding HD record of the HD information database;
(b) selecting the SP to upgrade the HD with, by:
  i) selecting at least one SP record within the SP repository, having the model and the vendor of its threshold hardware profile matched to the model and the vendor, respectively, of the HD record corresponding to the HD being upgraded;
  ii) out of those selected in i), if any, selecting at least one SP record having the hardware revision of the respective threshold hardware profile, which is earlier than the hardware revision of the HD record corresponding to the HD being upgraded;
  iii) out of those selected in ii), if any, selecting the record with the latest SP revision;
  iv) determining that that the SP revision of the record selected in iii) is later than the revision of the presently stored SP of the HD record corresponding to the HD being upgraded; and
  v) selecting the SP of the SP record selected in iii) as the SP to upgrade the HD with;
(c) determining that the current time is within a time window when an upgrade is allowed;
(d) determining that the HD is in a state that is appropriate for an upgrade to be performed;
(e) upon completion of steps (a) through (d), downloading the SP selected in step (b) to the storage medium of the HD.

In accordance with another aspect of the invention there is further provided an HD network comprising a plurality of HDs and a control center, which, in operation, upgrades the HDs of the network with an SP according to the above stated method.

In accordance with yet another aspect of the present invention there is further provided a computer-readable medium whose contents cause a control center of an HD network comprising a plurality of HDs to perform an automatic upgrade of the HDs according to the above stated method.

BRIEF DESCRIPTION OF THE DRAWINGS

Exemplary embodiments will now be described in conjunction with the drawings in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

The scope of the present invention covers networks of a wide variety of remotely located hardware devices (HDs) such as automated teller machines, wireless devices, data or voice network routers, digital subscriber link (DSL) modems, digital cable television set boxes, routers, amplifiers, gain equalizers, and other modules comprising a fiberoptic network, and other devices on a network. What is common to all the HDs within the scope of the present invention is: A) each HD is run by a central processing unit (CPU); B) the CPU is adapted, through a hardware and, or a software configuration, to perform a specialized set of tasks inherent to a particular HD type; C) an HD operates on a network of similar devices; and D) the HDs of the network are programmable from a single control center. The present invention is particularly useful for upgrade of HDs having expected lifetime exceeding 10 years and situated at difficult-to-reach locations.

Figure 2:
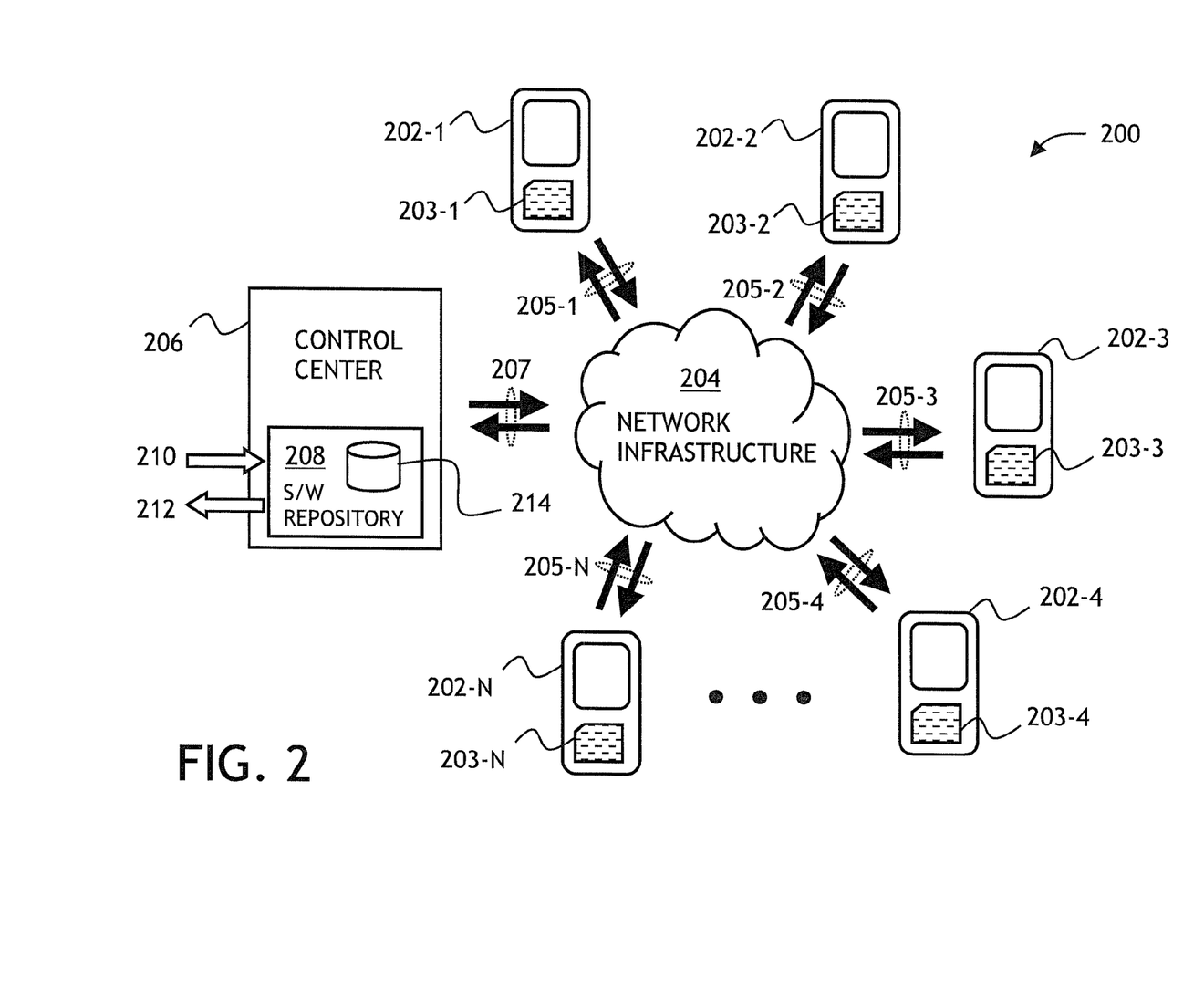
FIG. 2 is a diagram representing a specialized network of the present invention comprising hardware devices and a control center having a software repository.

Referring now to FIG. 2, a symbolic diagram representing a network 200 of the present invention is shown comprising HDs 202-1, 202-2, 202-3, 202-4, . . . , 202-N, a network infrastructure 204, and a control center 206 having a software repository 208 for storing software programs (SPs) intended for distribution among the HDs 202-1 . . . 202-N of the network 200. The software repository 208 has an input 210 for inputting new SPs and repository control commands, an output 212 for outputting information such as software upgrade statistics, and a computer readable medium 214, preferably a hard disk, for storing the SPs to be distributed, and for storing executable programs run by the control center 206. The HDs 202-1 . . . 202-N, having their respective memory media 203-1 . . . 203-N, preferably comprising a non-volatile flash memory, are connected to the network infrastructure through the bi-directional links 205-1 . . . 205-N. In operation, the control center 206 upgrades all the HDs 202-1 . . . 202-N by distributing new SPs stored on the storage medium 208 over the memory media 203-1 . . . 203-N of the HDs 202-1 . . . 202-N through a bi-directional link 207, the network infrastructure 204 and the respective bi-directional links 205-1 . . . 205-N. An important part of the present invention is that the entire upgrade process of the network 200 is controlled from the control center 206, which is programmed to select suitable SPs for the upgrade and the appropriate time to run the upgrade, and to download the SPs to the memory media 203-1 . . . 203-N of the HDs 202-1 . . . 202-N of the network 200.

To distribute appropriate SPs at an appropriate time among an appropriate set of HDs, the SPs stored on the computer readable medium 214 of the repository 208 are grouped into separate data structures, or SP records. In addition to the code of the SP itself, an SP record includes a revision of the SP, a validity time window of the SP, that is a time window within which the SP may be downloaded to an HD, and a threshold hardware profile of an HD compatible with the SP. The threshold hardware profile contains a model, a vendor, and a hardware revision of an HD with which the SP will work. Herein, the term "revision" is understood as a version of a hardware or a version of an SP, which has a particular release date. Since the revision refers to a release date, one can compare revisions in terms of their respective release dates, that is, one can determine which release is "earlier" or "later" based on their respective release dates. For example, if an HD has a hardware revision that is later than the revision of a threshold hardware profile of an SP, then it is assumed that the SP will work properly when downloaded to a storage medium of the HD, provided that the model and the vendor of the threshold hardware profile of the SP match those of the HD.

Further, to properly distribute SPs among the HDs 202-1 . . . 202-N of the network 200, the information relating to the HDs 202-1 . . . 202-N is stored at the control center 206 in an HD information database in a form of a plurality of HD records. Each HD record corresponds to an HD of the network and contains a hardware profile of the HD, a revision of an SP presently stored in a storage medium of the HD, an "upgrade-mode" flag, and a "software out-of-date" indicator. The hardware profile contains a model, a vendor, and a hardware revision of the HD corresponding to the HD record. The "upgrade mode" flag of the HD record can have three positions: "Manual", "Automatic", and "On Alarm". It serves as a switch during an automated upgrade procedure which will be described in detail below. The "software out of date" indicator, in its simplest form, is an alarm which can have two possible states: "Software is Out of Date" and "Software is Up-to-Date". Its purpose is to indicate whether an upgrade is required for an HD corresponding to the HD record containing the alarm. When the alarm is in the "Software is Out of Date" state, an upgrade is required.

Yet further, each listed HD may have an associated service time window, preferably a time window during each day when an upgrade operation may be performed on the HD. The service time window information, the "upgrade mode" flags and the "software out of date" alarms are preferably stored at the control center; the "software out of date" alarm can also be stored at the HD itself.

Figure 3:
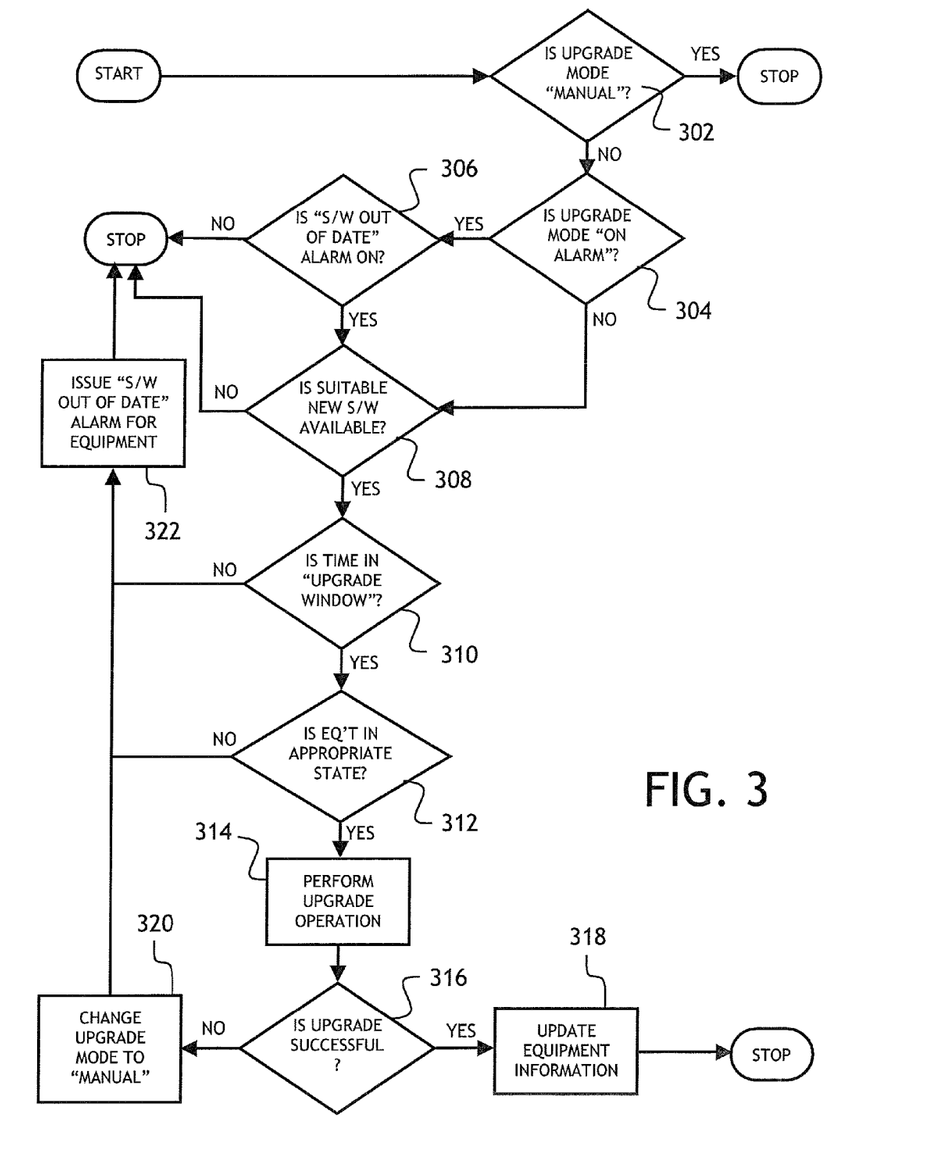
FIG. 3 is a block diagram of an automatic upgrade method of the present invention.

Turning now to FIG. 3, an exemplary embodiment of a procedure for an automatic upgrade of an HD from a control center is illustrated by means of a block diagram. The procedure is repeated for each HD record of the HD information database. First, as indicated by a decision box 302, the control center reads the "upgrade mode" flag of the HD to be upgraded. If the "upgrade mode" flag is in "Manual" position, the upgrade procedure of the HD is stopped. If the "upgrade mode" flag is in "On Alarm" position as indicated by a decision box 304, the control center is instructed to check the "software out of date" alarm, as indicated by a decision box 306. If the alarm is in "Software is Up-to-Date" state, the procedure is stopped since no upgrade of the HD is necessary; if the alarm is in "Software is Out of Date" state, or, alternatively, if the "upgrade mode" flag of the HD is in "Automatic" position, the control center is instructed to continue and check if a suitable SP is available in the software repository, as indicated by a decision box 308. The "suitability" of an SP is decided based upon the hardware profile, that is, the model, the vendor, and the hardware revision of the HI) being upgraded. This information is compared with the appropriate information stored in the threshold hardware profile associated with SPs stored in the repository. Out of all suitable SPs, the newest available SP, that is the SP with the latest revision, is selected. Then, a check is performed whether the revision of this SP is newer than the revision of the current SP stored in the memory of the HD being upgraded. If it is newer, it is selected as the SP to upgrade the HD with.

If a new SP is unavailable for the HD being upgraded, either because there isn't any suitable program for the particular HD profile, or because the matching repository program is not newer than the program already stored in the memory of the HD, the procedure stops. If the new SP is available, then the control center checks, as indicated by a decision box 310, if present time is in the "upgrade window". The "upgrade window" can be the allocated time of the day when the upgrade of a particular HD, or of all HDs of the network, can be performed; it can also be the validity time window within which the SP, selected at the step 308, can be installed; or, preferably, it is an "AND" combination of both said time windows. If the present time is within thereby defined "upgrade window", the control center is instructed to check, as indicated by a decision box 312, whether the hardware of the HD is in a state appropriate for the upgrade, for example if it is not busy or even if it is turned on and connected to the network. This is done by sending a request from the control center to the HD over the HD network, and receiving a message from the HD to the control center over the HD network, indicating whether the HD is in a state that is appropriate for an upgrade to be performed. If the HD is found to be in an appropriate state, the control center performs the upgrade operation 314 on the HD by downloading the SP to the memory medium of the HD. If, however, the present time is not in the upgrade time window, or the HD is not found to be in a state appropriate for the upgrade, the "software out of date" alarm is raised at a step 322, and the procedure stops.

After completing the upgrade operation 314, a check 316 is performed whether the upgrade was successful. It can be performed by running a series of tests of the HD through execution of commands delivered from the control center, or through the execution of a built-in self-test of the HD. If the upgrade was not successful, the "upgrade mode" flag is switched to the "Manual" position, as symbolized by a box 320, the "software out of date" alarm is raised at the step 322, and the procedure stops. If the upgrade was successful, the relevant equipment information, such as the downloaded SP version, is updated at a step 318, by updating a corresponding record in the HD information database, and the procedure stops.

It is understood that various modifications of the method represented by the block diagram of FIG. 3 are possible without departing from the spirit and the scope of the present invention. For example, the order of performing the checks 310 and 312 can be interchanged, with no effect whatsoever on the final result. Further, even though it is preferable that the steps 302-322 are performed by the control center, some of the steps can be delegated by the control center to be performed directly by the HD, or they can be done jointly with the HD. For example, the step 316 can be performed by a HD which, as has been noted above, can run a self-test sequence after the upgrade operation 314 is completed and report back to the control center with an error message if the self-test fails.

As has been noted, the procedure illustrated in FIG. 3 is automatically repeated for each known HD of the network. Preferably, it can also be repeated at pre-defined time intervals, to ensure that the HDs are always upgraded with the latest available version of a relevant SP stored in the software repository. To save network resources and to preserve network stability, it is important that the automatic upgrade procedure is not run for those HDs the automatic upgrade procedure of which failed in the past. This is why the step 320 is executed whenever the automated upgrade procedure fails. When the "upgrade mode" flag of an HD is in "Manual" position, a manual upgrade of that HD has to be performed by an operator having an access, a direct or a remote one, to the control center.

Figure 4:
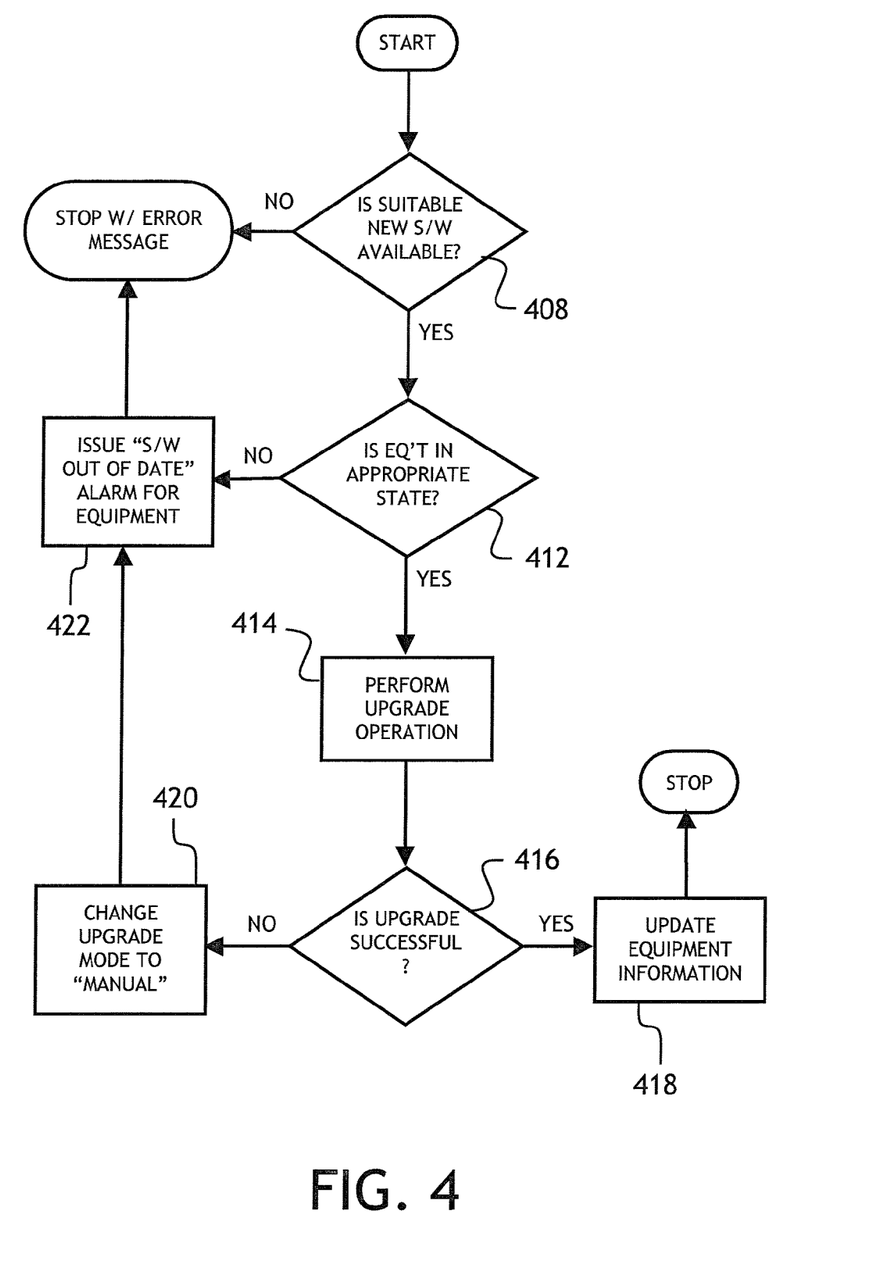
FIG. 4 is a block diagram of a manual upgrade method of the present invention; and, FIG. 5 is a block diagram of a software repository query according to the present invention.

Turning now to FIG. 4, a block diagram of a manual software upgrade method of the present invention is presented. At a step 408, a check is performed if a suitable SP is available in the software repository. This step corresponds to the step 308 of FIG. 3. If the suitable SP is available, the control center determines, as indicated by a box 412, whether the hardware of the HD is in a state appropriate for the upgrade. If it is, the upgrade operation is performed, as is indicated by a box 414, by downloading the SP to the memory medium of the HD. If it is not, the "software out of date" alarm is raised at a step 422, and the procedure stops with an appropriate error message.

Similarly to the method of an automatic upgrade presented above, in the manual method of FIG. 4, a decision, indicated by a decision box 416, is made whether the upgrade was successful. If the upgrade was not successful, the "upgrade mode" flag is switched to the "Manual" position at a step 420, the "software out of date" alarm is raised at the step 422, and the procedure stops with an error message indicating the upgrade failure. If the upgrade was successful, the equipment information is updated at a step 418, and the procedure stops. After the procedure stops, an operator has an option to manually switch the "upgrade mode" flag to an "Automatic" position, to make sure that the next upgrade is automatic.

Figure 5:
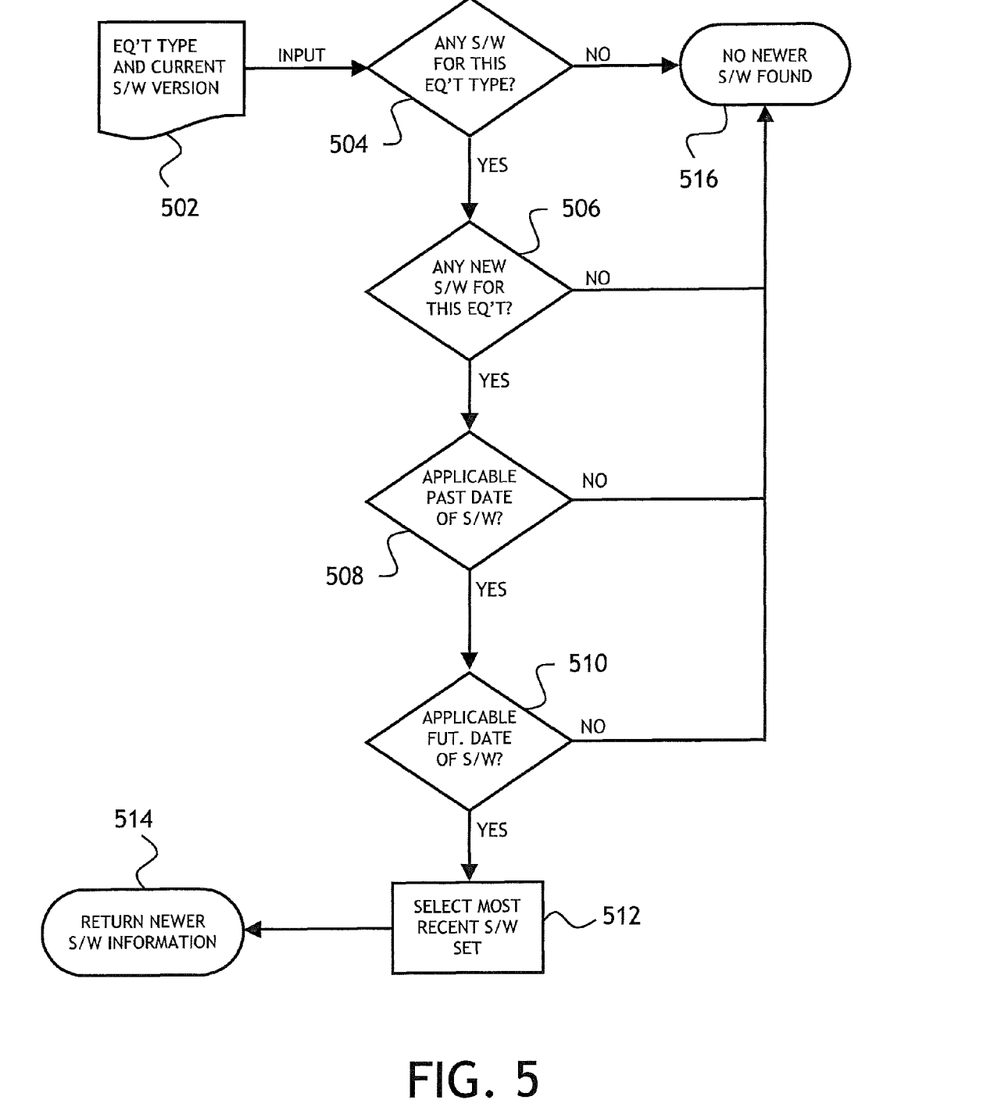

Referring now to FIG. 5, a block diagram of a software repository query is shown. The repository is queried with input data represented by a box 502 containing a hardware profile and a current SP version of the HD being upgraded. The processing of the query comprises a step 504, at which a subset of SPs is selected which is appropriate for the hardware profile of the HD, as has been explained above. If no suitable SP is found, the query stops at a point 516 with an error message. If more than one suitable SP is available, the newest SP of those available is selected; if only one SP is available, that SP is selected. Then, a series of steps are performed: a step 506 of determining whether the selected SP version is newer than the current SP version stored in the memory medium of the HD; a step 508 of determining whether the current date is past the beginning date of a validity time window of the selected SP; and a step 510 of determining whether the current date is before the end date of the validity time window of the selected SP. If none of the steps 506 through 510 fail, that is, if none of them results in a "No" answer as shown in FIG. 5, then the selected SP is designated at a step 512 as the answer to the query. The SP information is returned at a point 514. If, on the other hand, at least one of the steps 506, 508, or 510 fails, the query is terminated at a point 516 with an appropriate error message.

The query of FIG. 5 can be performed as a part of the automated upgrade procedure of FIG. 3, see the steps 308 and 310, or it can be performed as a part of the manual upgrade procedure of FIG. 4, see the step 408. The purpose of having a validity time window associated with every SP in the repository is, first, to prevent an upgrade of HDs by an SP before the upgrade rollout date for that SP, and second, to prevent an upgrade of HDs by an outdated SP. It may be known to a network carrier, for example, that an SP of a later revision, e.g. Revision B, will become available after a certain period of time, and it may be very important to prevent upgrade by the SP of the Revision B after that period of time has expired.

What is claimed is:

1. A method for upgrading a hardware device (HD) with a software program (SP), wherein the HD has a storage medium for storing the SP, and wherein the HD is a part of an HD network that includes a plurality of hardware devices (HDs) and a control center having:
    an HD information database including a plurality of HD records corresponding to the HDs of the network, wherein each HD record contains a hardware profile, a revision of a presently stored SP, an "upgrade-mode" flag, and a "software out-of-date" indicator, wherein said hardware profile contains a first model, a first vendor, and a first hardware revision; and
    an SP repository for storing software programs (SPs), wherein the SP repository includes a plurality of SP records, wherein each SP record contains an SP, a revision of said SP, a validity time window of said SP, and a threshold hardware profile of an HD compatible with said SP, wherein said threshold hardware profile contains a second model, a second vendor, and a second hardware revision;
    wherein the method comprises the steps of:
    (a) determining that the HD is eligible for an automatic upgrade, in dependence upon a state of the "upgrade-mode" flag stored in a corresponding HD record of the HD information database;
    (b) selecting the SP to upgrade the HD with, by:
        i) selecting at least one SP record within the SP repository, having the second model and the second vendor of its threshold hardware profile matched to the first model and the first vendor, respectively, of the HD record corresponding to the HD being upgraded;
        ii) out of those selected in i), selecting at least one SP record having the second hardware revision of the respective threshold hardware profile, which is earlier than the first hardware revision of the HD record corresponding to the HD being upgraded;
        iii) out of those selected in ii), selecting the record with the latest SP revision;
        iv) determining that the SP revision of the record selected in iii) is later than the revision of the presently stored SP of the HD record corresponding to the HD being upgraded; and
        v) selecting the SP of the SP record selected in iii) as the SP to upgrade the HD with;
    (c) determining that the current time is within a time window when an upgrade is allowed;
    (d) determining that the HD is in a state that is appropriate for an upgrade to be performed;
    (e) upon completion of steps (a) through (d), downloading the SP selected in step (b) to the storage medium of the HD.

2. A method of claim 1, further comprising the steps of
    (f) determining if the SP has been successfully downloaded to the storage medium of the HD, and
    (g) if the SP has not been successfully downloaded, doing one of, or both of, the following: assigning a value to the "upgrade mode" flag disallowing an automatic upgrade; and bringing the "software out-of-date" indicator to a state indicating that the SP, stored in the storage medium of the HD, is out of date.

3. A method of claim 2, wherein:
    step (g) is performed by the control center;
    step (f) is performed by the HD; and
    step (f) further includes sending a confirmation message from the HD to the control center over the HD network, if the downloading was successful.

4. A method of claim 1, wherein step (a) further comprises a conditional step of
    (a1) determining that the state of the "software out-of-date" indicator stored in the corresponding HD record indicates that the SP stored in the storage medium of the HD is out of date,
    wherein the conditional step (a1) is performed only if the state of the "upgrade-mode" flag indicates that the step (a1) needs to be performed.

5. A method of claim 4, wherein the "software out-of-date" indicator of each HD record of the HD information database comprises a "software out-of-date" alarm having two states: "software is out of date" and "software is up to date".

6. A method of claim 1, wherein steps (a) to (e) are performed by the control center.

7. A method of claim 6, wherein the HD can only be upgraded during a service time window corresponding to the HD, and wherein the time window when the upgrade is allowed is within the service time window of the HD.

8. A method of claim 6, wherein step (d) is performed by sending a request from the control center to the HD over the HD network, and receiving a message from the HD to the control center over the HD network, wherein the message confirms that the HD is in a state that is appropriate for an upgrade to be performed.

9. A method of claim 6, further comprising repeating steps (a) to (e) at predetermined time intervals.

10. A method of claim 6, further comprising performing steps (a) to (e) for every HD having a corresponding HD record in the HD information database.

11. A method of claim 6, wherein step (b) is performed by querying the software repository with input data containing the vendor of the HD being upgraded, the model of the HD being upgraded, the hardware revision of the HD being upgraded, and the current SP revision of an SP stored in the storage medium of the HD being upgraded.

12. A method of claim 11, wherein the time window when the upgrade is allowed is within the validity time window of the SP record corresponding to the SP selected at step (b).

13. A method of claim 11, wherein the HD can only be upgraded during a service time window corresponding to the HD, and wherein the time window when the upgrade is allowed is within the service time window of the HD and within the validity time window of the SP record corresponding to the SP selected at step (b).

14. A hardware device (HD) network comprising:
    a plurality of hardware devices (HDs) each having a storage medium for storing a software program (SP); and
    a control center having:
        an HD information database including a plurality of HD records corresponding to the HDs of the network, wherein each HD record contains a hardware profile, a revision of a presently stored SP, an "upgrade-mode" flag, and a "software out-of-date" indicator, wherein said hardware profile contains a first model, a first vendor, and a first hardware revision; and
        an SP repository for storing software programs (SPs), wherein the SP repository includes a plurality of SP records, wherein each SP record contains an SP, a revision of said SP, a validity time window of said SP, and a threshold hardware profile of an HD compatible with said SP, wherein said threshold hardware profile contains a second model, a second vendor, and a second hardware revision;

wherein the control center is configured to upgrade a selected one of the HDs of the network with an SP by:

(a) determining that the HD is eligible for an automatic upgrade, in dependence upon a state of the "upgrade-mode" flag stored in a corresponding HD record of the HD information database;

(b) selecting the SP to upgrade the HD with, by:
   i) selecting at least one SP record within the SP repository, having the second model and the second vendor of its threshold hardware profile matched to the first model and the first vendor, respectively, of the HD record corresponding to the HD being upgraded;
   ii) out of those selected in i), selecting at least one SP record having the second hardware revision of the respective threshold hardware profile, which is earlier than the first hardware revision of the HD record corresponding to the HD being upgraded;
   iii) out of those selected in ii), selecting the record with the latest SP revision;
   iv) determining that the SP revision of the record selected in iii) is later than the revision of the presently stored SP of the HD record corresponding to the HD being upgraded; and
   v) selecting the SP of the SP record selected in iii) as the SP to upgrade the HD with;

(c) determining that the current time is within a time window when an upgrade is allowed;

(d) determining that the HD is in a state that is appropriate for an upgrade to be performed;

(e) upon completion of steps (a) through (d), downloading the SP selected in step (b) to the storage medium of the HD.

15. A HD network of claim 14, wherein the HDs have a flash memory, and wherein the SP is stored in said flash memory as the result of the upgrade.

16. A HD network of claim 14, wherein the HD network is selected from a group consisting of: a wireless communications network; an automated teller machines network; a digital subscriber line modem network; a digital cable television network; and a fiberoptic network.

17. A HD network of claim 14, wherein the SP supports a functionality available to a selected sub-group of the HDs of the network, and wherein said functionality was unavailable before the upgrade.

18. A HD network of claim 17, wherein said sub-group is selected by comparing hardware profiles of the HDs of the network to a threshold hardware profile associated with the SP.

19. A computer-readable medium for use in a hardware network comprising:

a plurality of hardware devices (HDs) each having a storage medium for storing a software program (SP); and a control center having:
   an HD information database including a plurality of HD records corresponding to the HDs of the network, wherein each HD record contains a hardware profile, a revision of a presently stored SP, an "upgrade-mode" flag, and a "software out-of-date" indicator, wherein said hardware profile contains a first model, a first vendor, and a first hardware revision; and
   an SP repository for storing software programs (SPs), wherein the SP repository includes a plurality of SP records, wherein each SP record contains an SP, a revision of said SP, a validity time window of said SP, and a threshold hardware profile of an HD compatible with said SP, wherein said threshold hardware profile contains a second model, a second vendor, and a second hardware revision;

wherein in operation, contents of the computer-readable medium cause the control center to upgrade a selected one of the HDs of the network by:

(a) determining that the HD is eligible for an automatic upgrade, in dependence upon a state of the "upgrade-mode" flag stored in a corresponding HD record of the HD information database;

(b) selecting the SP to upgrade the HD with, by:
   i) selecting at least one SP record within the SP repository, having the second model and the second vendor of its threshold hardware profile matched to the first model and the first vendor, respectively, of the HD record corresponding to the HD being upgraded;
   ii) out of those selected in i), selecting at least one SP record having the second hardware revision of the respective threshold hardware profile, which is earlier than the first hardware revision of the HD record corresponding to the HD being upgraded;
   iii) out of those selected in ii), selecting the record with the latest SP revision;
   iv) determining that the SP revision of the record selected in iii) is later than the revision of the presently stored SP of the HD record corresponding to the HD being upgraded; and
   v) selecting the SP of the SP record selected in iii) as the SP to upgrade the HD with;

(c) determining that the current time is within a time window when an upgrade is allowed;

(d) determining that the HD is in a state that is appropriate for an upgrade to be performed;

(e) upon completion of steps (a) through (d), downloading the SP selected in step (b) to the storage medium of the HD.

20. A computer-readable medium of claim 19, wherein the HD network is selected from a group consisting of: a wireless communications network; an automated teller machines network; a digital subscriber line modem network; a digital cable television network; and a fiberoptic network.

* * * * *